United States Patent
Barbizet

(10) Patent No.: US 8,820,099 B2
(45) Date of Patent: Sep. 2, 2014

(54) THERMAL POWER UPGRADE FACILITY

(75) Inventor: Michel Barbizet, Puyricard (FR)

(73) Assignee: Atoll Energy, Meyreuil (FR)

( * ) Notice: Subject to any disclaimer, the term of this patent is extended or adjusted under 35 U.S.C. 154(b) by 228 days.

(21) Appl. No.: 13/521,385

(22) PCT Filed: Jan. 19, 2011

(86) PCT No.: PCT/FR2011/000031
§ 371 (c)(1),
(2), (4) Date: Aug. 30, 2012

(87) PCT Pub. No.: WO2011/089338
PCT Pub. Date: Jul. 28, 2011

(65) Prior Publication Data
US 2012/0324924 A1 Dec. 27, 2012

(30) Foreign Application Priority Data
Jan. 19, 2010 (FR) ...................................... 10 00194

(51) Int. Cl.
*F25B 7/00* (2006.01)

(52) U.S. Cl.
USPC ............................................ 62/79; 62/238.3

(58) Field of Classification Search
CPC ............ F25B 15/00; F25B 7/00; F25B 29/00; F25B 30/00; Y02B 30/62
USPC ............................. 62/79, 238.3, 129, 483, 487
See application file for complete search history.

(56) References Cited

U.S. PATENT DOCUMENTS

| 4,328,677 | A | * | 5/1982  | Meckler ........................... 62/124 |
| 4,471,630 | A |   | 9/1984  | Sugimoto et al. |
| 4,505,728 | A | * | 3/1985  | Cheng et al. ..................... 62/542 |
| 4,959,970 | A | * | 10/1990 | Meckler ........................ 62/176.1 |
| 4,987,748 | A | * | 1/1991  | Meckler ........................ 62/176.1 |
| 4,987,750 | A | * | 1/1991  | Meckler ........................ 62/238.6 |
| 5,181,387 | A | * | 1/1993  | Meckler ........................... 62/59 |
| 5,193,352 | A | * | 3/1993  | Smith et al. ....................... 62/90 |
| 5,207,075 | A | * | 5/1993  | Gundlach ........................ 62/434 |
| 5,966,955 | A | * | 10/1999 | Maeda .......................... 62/238.3 |

(Continued)

FOREIGN PATENT DOCUMENTS

| GB | 1 603 574 A       | 11/1981 |
| JP | 6-094321 A        | 4/1994  |
| WO | WO 2007/004962 A1 | 1/2007  |
| WO | WO 2008/127228 A1 | 10/2008 |

OTHER PUBLICATIONS

Fernandez-Seara et al., "Compression-absorption cascade refrigeration system", Applied Thermal Engineering, Sep. 13, 2005, vol. 26, pp. 502-512.

*Primary Examiner* — Mohammad M Ali
(74) *Attorney, Agent, or Firm* — Arent Fox LLP

(57) ABSTRACT

The invention relates to a facility making it possible to maximize the overall power output, the facility including at least one absorption group (7), for producing ice water, and a heat pump (10). The particular feature of the facility is that the inlet of the heat pump power supply system is connected to the outlet of the exhaust system (9) of the absorption group (7) so as to transfer at least part of the low-temperature thermal power from the exhaust system (9) to the hot water production system (12). Such a facility also makes it possible to generate sanitary ice water and hot water and desalinate sea water.

10 Claims, 3 Drawing Sheets

(56) References Cited

U.S. PATENT DOCUMENTS 6,672,099 B1* 1/2004 Yoshimi et al. ............... 62/467
6,889,520 B2* 5/2005 Sano et al. .................... 62/434

2003/0150233 A1* 8/2003 Jensen et al. .................. 62/268
2003/0159457 A1* 8/2003 Faqih ............................ 62/285
2004/0144528 A1 7/2004 Kunimoto et al.

* cited by examiner

THERMAL POWER UPGRADE FACILITY

CROSS-REFERENCED TO RELATED APPLICATION

This application is a National Stage entry of International Application PCT/FR2011/000031, filed Jul. 19, 2011, which claims priority to French Patent Application No. 1000194, filed Jan. 19, 2010, the disclosure of the prior applications are hereby incorporated in its entirety by reference.

This invention relates to a facility and a thermal method intended to upgrade the low-temperature thermal power, dissipated in particular by absorption groups for producing ice water which are often integrated into the multi-generation systems.

Multi-generation system means facilities that make possible the simultaneous production of several energies, by using the heat by-product from the production of electricity. For example, a tri-generation allows for the simultaneous production of electricity, of heat and of cold, which substantially increases the output on the primary power.

Low-temperature thermal power means the thermal power recovered primarily on systems (for example oil or water) of which the temperature is less than 95° C. The recoverable thermal power on driving machines, engine or turbine typically, have different temperature levels. For example, for an engine, the exhaust gases have a temperature in the vicinity of 450° C., oil is at approximately 100° C., water at 90° C. and radiated heat at 45° C. The thermal power downstream of an absorption group is generally 32° C.

To date, ice water absorption groups are used according to the facility in FIG. 1 attached in the appendices.

The heat introduced into the cold absorption group (7) is either heat produced directly (gas combustion in particular) or, in a more effective manner, recovered heat (pressurized water or steam) in an electrical power production system, (gas turbines, gas or Diesel alternating engines etc.).

The ice water produced supplies for example air conditioning systems and the low-temperature heat (sum of the heat introduced and the cold subtracted) is extracted by the system (9) in water evaporation cooling towers (21) provided with fans (22).

Absorption groups for producing ice water are often incorporated into electrical power production plants (gas or Diesel alternating engines or turbines), or in co-generation or tri-generation power plants.

Facilities of this type are regulated by automatic devices that use the heat available in the various systems, supplement it if required, and control the evacuation of the excess heat if the systems cannot absorb all of the thermal power produced by the turbines or engines.

This excess is then dissipated by the coolants of the generators (water/water exchanger or air cooler). In any case, the low-temperature heat extracted from the ice water absorption groups is not used.

This invention aims to upgrade the low-temperature power of the ice water absorption groups integrated into multi-generation systems.

To this effect, is proposed according to a first aspect of the invention, a power upgrade facility comprising at least one absorption group for producing ice water and a heat pump.

The absorption group for producing ice water, has at least:
a thermal power feed fluid system,
an ice water production system, able to be connected to a consumption or storage element,
a low-temperature thermal power evacuation fluid system, having an inlet in the absorption group and an outlet of the absorption group.

The heat pump, of which the power can be modulated according to need, has at least:
a feed fluid system of the heat pump with thermal power, having an inlet in the heat pump and an outlet of the heat pump,
a hot water production system.

The specificity of the facility resides in the fact that the inlet of the feed system of the heat pump is connected to the outlet of the evacuation system of the absorption group in order to transfer at least one portion of the low-temperature thermal power from the evacuation system to the hot water production system.

A heat pump is generally constituted of an evaporator, of a compressor driven by an electric engine, of a condenser, and of a pressure reducer. A heat pump is a mechanical pump, which clearly differentiates it from an absorption group which operates chemically, thanks to an absorber, a concentrator, an evaporator, and a condenser.

In the case of this invention, the heat pump is used, on the evaporator side (i.e. of the side of the supply of the heat pump), in order to absorb the low-temperature heat of the ice water group, and, on the condenser side (i.e. the side of the hot water production system of the heat pump), in order to return this heat at a higher temperature level. As such, the overall output of the system is increased since the heat evacuated from the absorption group is used instead of being simply dissipated.

According to an advantageous embodiment, the facility further comprises means of regulating the temperature, the electrical power, the thermal power, and the levels of the various fluids required. They measure the temperature at different points of the systems as well as the electrical power, the thermal power, and the levels, so as to minimize the temperature differences between the inlet of the feed of the heat pump and the hot water production system, in order to maximize the coefficient of performance (COP) of the heat pump. Indeed, the smaller the difference in temperature between the evaporator and the condenser is, the better the coefficient of performance (COP) of the heat pump is.

According to another advantageous embodiment, the hot water production system of the heat pump (i.e. condenser side) is connected to at least one other heat generation system, in order to reach a predetermined minimum temperature in order to use this power in at least one other system that consumes thermal power, while still maintaining the coefficient of performance (COP) of the heat pump as high as possible.

According to still another advantageous embodiment, the outlet of the feed system of the heat pump is connected to the inlet of the evacuation system in the absorption group.

More preferably, the difference in temperature between the outlet of the evacuation system of the absorption group and the inlet of the evacuation system of the absorption group is less than 5° C., more preferably of a magnitude of 4° C. in accordance with the recommendations.

Advantageously, the ice water production system of the absorption group is connected to an air conditioning system, and moreover, the hot water production system of the heat pump supplies a sea water desalination unit.

This invention further comprises a method for upgrading a facility such as defined hereinabove. As such, the means of regulating:
Measure the temperature, the electrical power, the thermal power, and the levels, at different points of the facility;

Record these temperatures in order to establish typical curves reflecting the usage averages over a given period of time;

Compare the temperatures measured with typical curves in order to determine variations;

According to variations, they adjust the operating parameters of the various systems of the facility in order to anticipate the needs in power of the various heat consumption or storage stations.

As such, the means of regulating compare the measurements of the thermal parameters of the system with the pre-recorded heat consumption curves (hourly, daily etc.), and the state of the consuming systems makes it possible, at any time, to use all of the heat available by anticipated directing of the power in the various systems.

Such a method makes it possible in particular to maximize the recovery of the thermal power available in the low temperature thermal power exhaust system of the absorption group by adapting, in anticipation, the regulating parameters, after analysis of the variations in temperature measured, and comparison of these variations with typical curves. Such a regulation also makes it possible to better distribute the recovered heat to the consuming systems (for example: the desalination unit) or to the thermal power storage units (example: hot water/ice water).

Advantageously, the means of regulating regulate the parameters of the other heat generation systems so that the temperature of the hot water production system of the heat pump is minimum in such a way that the COP of the heat pump is maximal, and that the temperature of the hot water production system of the heat pump, after exchange with the other heat generation systems, allow for a heat transfer towards the consuming systems in order to reach the operating temperature of the various heat consumption or storage stations. This dynamic control of the heat transfer makes it possible to minimize the electrical consumption of the engine of the heat pump (maximized COP).

More preferably, the means of regulating control the condensation temperature of the heat pump. The regulating of the condensation temperature makes it possible, after exchange with the other co-generation systems, an effective heat transfer to the consuming systems. The condensation temperature of the heat pump must be at the lowest level compatible with the heat transfer to the consuming systems, after exchange with the other recovery systems. This low temperature level, adjusted in real time according to the state of the consuming systems, makes it possible, at any time, to operate with the best coefficient of performance possible for the heat pump.

The invention, according to a preferred embodiment, shall be better understood and its advantages shall appear better when reading the following detailed description, provided for the purposes of information and which is in no way restricted, and in reference to the annexed drawings shown hereinafter:

The identical elements shown in FIGS. 1 to 3 are identified with identical numerical references.

Figure 1:
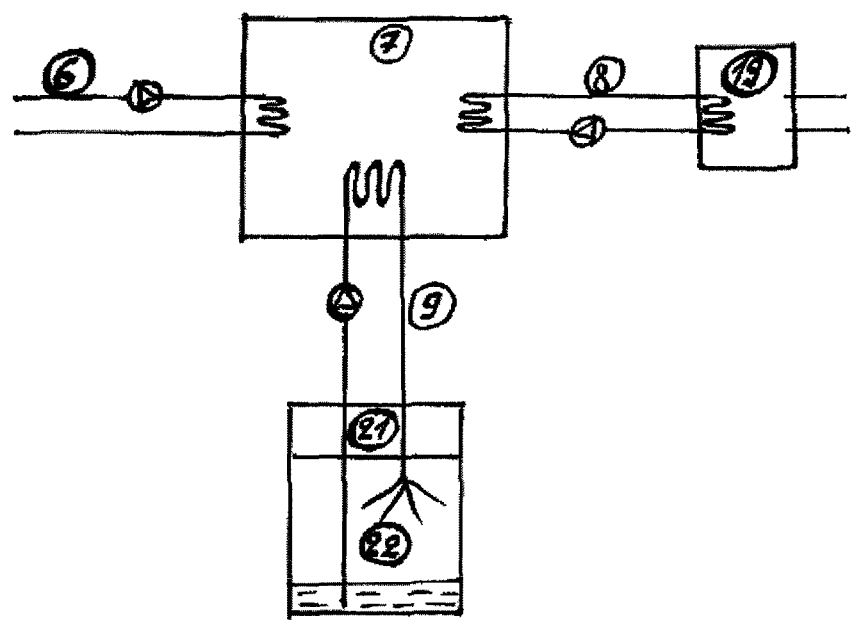
FIG. 1 shows a facility comprising a commonly used absorption group.

Conventionally, the ice water absorption groups 7 are used according to the facility in FIG. 1.

Heat is introduced by the feed fluid system 6 (pressurized hot water system) in the cold absorption group 7. This heat is either directly produced heat (gas combustion in particular) or, in a more effective manner, recovered heat (pressurized water or steam) in an electrical power production system. (gas turbines, gas or Diesel alternating engines etc.).

Ice water produced by the cold absorption group 7 flows in the ice water production system 8 and supplies ice water consumption or storage elements 19, for example air conditioning systems. The low-temperature heat (sum of the heat introduced and the cold subtracted) is extracted by the low-temperature thermal power evacuation fluid system 9 in the water evaporation cooling towers 21 provided with fans 22.

Figure 2:
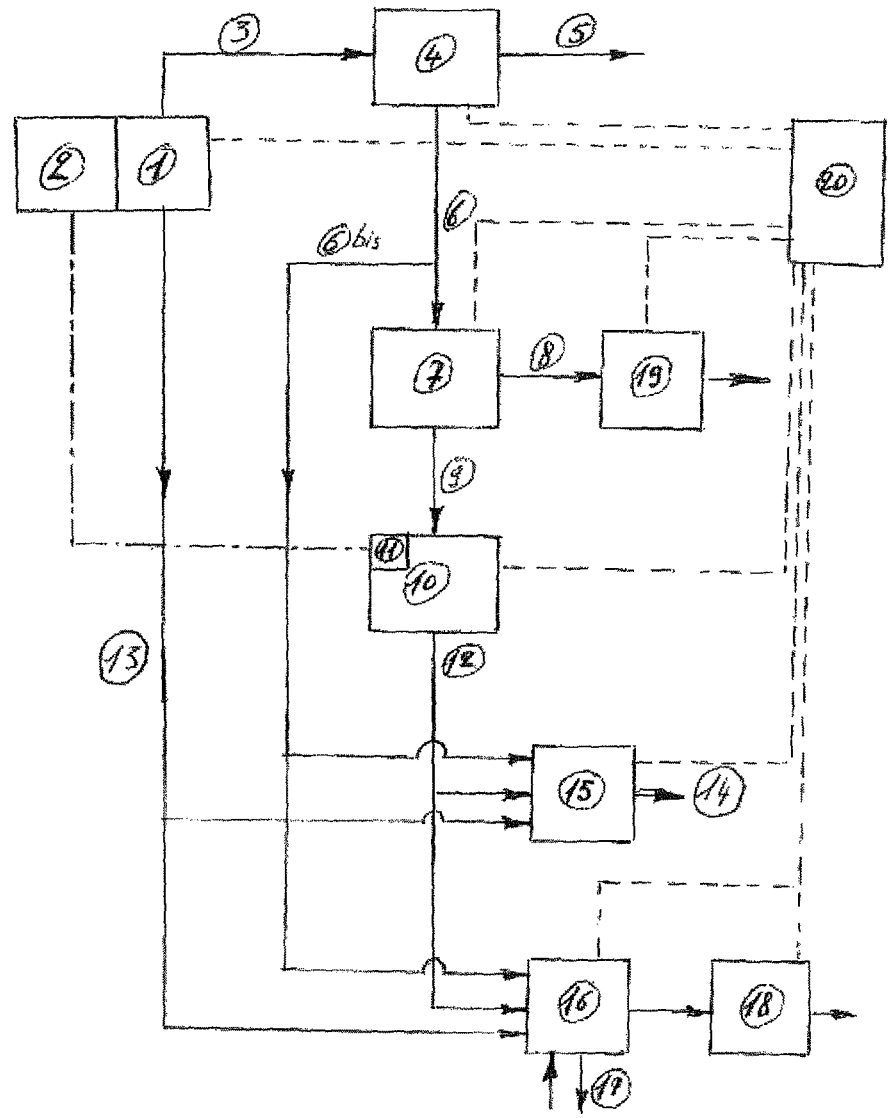
FIG. 2 shows a block diagram of an embodiment of the invention that shows the flows of heat.

FIG. 2 shows the invention incorporated into a multi-generation system, i.e. for the production of electricity and of heat. The thermal power is here used for various needs.

The driving machine 1 of the electric generator is integral with the driven generator 2. For example, the driving machine 1 is a gas or Diesel engine, and the driven generator 2 is an alternator. An exhaust system 3 makes it possible to recover the heat of the engine 1 and upgrades the exhaust gas in a heat exchanger 4 in order to generate pressurized hot water or steam in the fluid system 6.

The exhaust gases at a temperature greater than the condensation temperature of its components are evacuated in the pipe 5.

The ice water absorption group 7 can be single or multi-stage, more preferably with two stages. Its generator (71 FIG. 3) is supplied with heat by the feed fluid system 6. The evaporator 73 supplies the ice water production system 8, and the low-temperature heat (30° C.) is evacuated from the condenser 72 by the low-temperature thermal power evacuation system 9.

The ice water production system 8 is connected to ice water consumption or storage elements 19 (for example, an air conditioning system).

The heat pump 10 is driven by an electric engine 11.

In the embodiment according to the invention, the heat pump 10 is supplied by a feed fluid system which is directly connected to the low-temperature thermal power evacuation fluid system 9 of the absorption group 7.

More precisely, the inlet of the feed fluid system in the heat pump 10 is connected to the outlet of the low-temperature thermal power evacuation fluid system 9 of the absorption group 7.

The system 9 by passing through the heat pump 10 is cooled by the evaporator 101 (cf. FIG. 3) of the heat pump 10.

The outlet of the feed fluid system of the heat pump 10 is then connected to the inlet of the low-temperature thermal power evacuation fluid system 9 of the absorption group 7.

The system 9 then has a temperature that is less when exiting the heat pump 10 than when entering it.

More preferably, this difference in temperature in the system 9 between the outlet of the absorption group 7 and the inlet in the absorption group 7 after having passed in the heat pump 10 is of a magnitude of 4° C., in accordance with the standard recommendations.

The heat pump 10 as such has two functions:
the first is to cool the condenser and the absorber of the absorption group 7, through the system 9;
the second is to raise the low-temperature thermal power of the system 9 to a temperature level that can be used by the systems that consume heat.

Indeed, the temperature at the outlet of the condenser 103 of the heat pump 10, i.e. the temperature of the hot water production system 12, will be constantly maintained at the minimum required in order to operate the heat pump 10 with a high coefficient of performance (COP), thanks to a low difference in temperature between the evaporator 101 and condenser 103 systems, i.e. between the inlet of the feed fluid system in the heat pump and the hot water production system 12.

The high level of the coefficient of performance of the heat pump is essential for the global power output. This high output through the small difference in temperature between the evaporator 101 system (connected to the system 9) and the system of the condenser 103 (connected to the system 12) is made possible by the raising of the temperature in the system 12 downstream of the heat pump 10 if a higher temperature is required; for example, via heat exchanges in the successive exchangers with the heat at a higher temperature coming from the cooling system 13 of the engine 1 (generally at a temperature of about 90° C.). At certain periods of the cycle, this phenomenon can be amplified thanks to the connection of the system (6bis) directly recovered on the feed fluid system 6 of the cold absorption group 7, as well as, possibly, with other generation or recovery systems.

In the embodiment shown in FIG. 2, the uses of the thermal power are then:
  the hot water storage and/or preparation unit 15,
  and the sea water desalination unit 16 via evapo-condensation.

The sea water is carried into the unit by the system 17, the fresh water is stored in the reservoir 18, and the residual brine is evacuated by the system 17b.

The hot water of the unit 15 is carried to the various usage stations by the system 14.

The raising in temperature of the system 12 by adding the other recovery systems makes it possible to reach the level of temperature required by the transfer of temperature to the heat usage systems 15 and 16.

All of the power parameters are managed by the control and regulation cabinet 20 and the instrument links are marked as a dotted line.

In addition to the conventional regulation functions, this automatic regulation cabinet 20 constantly provides:
  the dynamic regulation of all of the parameters,
  the maximization of the free heat recovered in the various systems,
  and the maintaining of the coefficient of performance of the heat pump 10 at the highest level.

According to the electrical power produced by the generator 2, the regulation 20 anticipates the recoverable thermal power in the co-generation systems, i.e. on the exhaust gas 3 as well as on the cooling system 13 of the engine 1.

The thermal needs of the power recovery systems are also known by measurement and memorization of change curves. This knowledge through analysis of the typical curves as specification makes it possible to regulate the generation and the consumers of thermal power. The heat is directed by anticipation to the consumer and/or the storage element of which the need is going to increase.

In the embodiment in FIG. 2, the quantity of cold power absorbed by the system 8 is measured and compared to the typical curves memorized in order to anticipate its hourly and daily change. The quantity of heat available in the system (6bis) will be as such determined by calculation. The same also applies for the thermal power required and their changes in the systems pour hot water 15 and the desalination of sea water 16.

This regulation unit 20 analyses in real type all of the electrical and thermal (cold) power parameters demanded by the various systems incorporating these values and comparing them to the typical curves memorized. The regulation cabinet 20 controls the regulating members in order to allow for the maximum recovery of the heat by anticipation of the adjustments according to the variations of the power parameters measured in relation to the expected parameters (placed in specification).

In addition, the regulation cabinet 20 will maintain the coefficient of performance (COP) of the heat pump 10 at the highest, by maintaining the temperature in the system 12 at the minimum of what can be used in the systems 15 and 16 after having added to it the thermal power of systems 13 and (6bis) and, possibly, of other recovery and/or generation systems.

Thanks to these anticipations on all of the systems that generate or consume heat, the regulation makes it possible to recover all of the power co-generated by an always optimal use of the flows in the various consuming systems or to the storage for thermal power (hot water or ice water) or to the storage of the result of the work of the thermal power such as desalinated water.

Regulation therefore makes possible an anticipated directing of the thermal power towards, if required, the storage of ice water 19 or hot water 15, as well as to the pool of desalinated water 18.

In addition, the regulation cabinet 20 controls the condensation temperature of the heat pump 10 so that the latter works constantly with the best coefficient of performance possible. By regulating the condensation temperature of the heat pump 10, it controls the temperature of the water in the system 12. This temperature will be adjusted constantly in order to maximize the coefficient of performance and the recovery.

EXAMPLE 1 if the system at an instant t does not require any need for desalination and all of the heat of the system 6 is consumed by the absorption group 7, then no thermal power will be carried by the system (6bis).

EXAMPLE 2

If the storage of hot water 15 is at 55° C., and the heat transfer is carried out with a difference in temperature of 5° C., the water before the storage unit 15 must then be at 60° C. The regulation system 20 will calculate an optimum power between the COP of the heat pump 10, the temperature of the system and the heat available and/or required in the systems 6bis and 13. For example, the regulation 20 controls the condensation temperature of the heat pump 10 so that its system 12 transfers its quantity of heat to hot water at 57.5° C., and the difference is supplied by the engine system 13 in order to reach the temperature of 60° C. The temperature in the system 12 will therefore be as low as possible in order to make it possible to obtain the best coefficient of performance possible for the heat pump 10 according to the desired temperatures. This remains possible in all of the states of the system.

Figure 3:
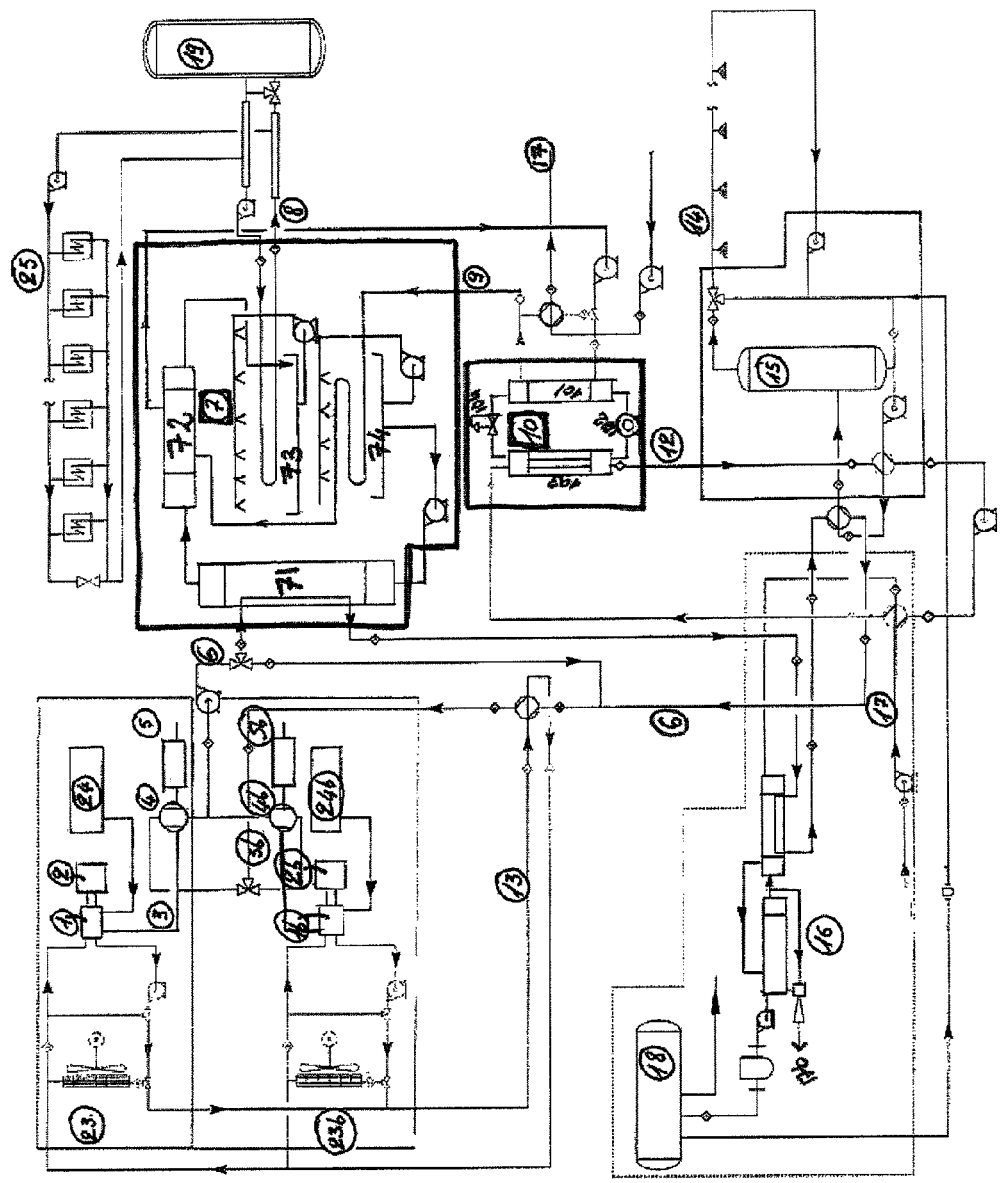
FIG. 3 shows an example embodiment of the invention in accordance with FIG. 2, wherein the fluid systems can be seen.

FIG. 3 makes it possible to better show the various systems implemented in order to carry out the thermal exchanges required for the production of heat and cold in a facility in accordance with the block diagram in FIG. 2.

The facility in FIG. 3 uses two engines (1 and 1b) associated to their respective alternator (2 and 2b).

They are supplied by fuel stored in the reservoirs (24 and 24b).

The engines (1 and 1b) are cooled by the system 13, which is itself cooled by the elements (23 and 23b) which are air coolers.

The systems (3 and 3b) which exit from the engines (1 and 1b) towards the exhaust pipes (5 and 5b) pass through the exchangers (4 and 4b).

By passing through the exchangers (4 and 4b), the systems (3 and 3b) heat the loop circulating in these two exchangers (4 and 4b) directly connected to the system 6. The fluid flows in this loop thanks to a circulation pump.

On a first three-channel valve, the system 6 passes through the generator of the cold absorption group 7.

In addition, when exiting from the absorption group 7, this same system 6 supplies a first element of the desalination system. This system 6 then passes through another exchanger with the system of the unit 15 for hot water then a last exchanger with the system 13 (cooling system of the engines 1 and 1b).

On the cold absorption group 7 (more preferably with two stages), the heat from the system 6 passes through the generator 71. The system coming from the generator 71 supplies in order the condenser 72, the evaporator 73 and the absorber 74 before passing through the generator 71 again.

The evaporator 73 supplies the ice water system 8 connected to the storage and/or distribution element 19. Other systems can be connected to the system 8, for example in order to feed units 25. These units 25 are, for example, ice water distribution units such as fan coil units (i.e. water-air exchangers).

The system 9 (low-temperature evacuation system), coming from the condenser 72, passes through the evaporator 101 of the heat pump 10 (with a single stage), then the absorber 74 and again the condenser 72 of the cold absorption group 7. The circulation of the system 9 is provided by a circulation pump.

The system 9 can also cross a sea water system 17 in order to raise by a few degrees its temperature before the latter passes through the desalination units 16.

The internal system of the heat pump 10 recovers heat in the evaporator 101 and passes through the compressor 102, the condenser 103, then the pressure reducer 104.

The condenser 103 makes it possible to supply the system 12 for the production of hot water.

The system 12 crosses the system of the unit 15 via a first exchanger, then, via a second exchanger, the system 12 crosses the system 17 for the inlet of sea water. The circulation of the fluid in the system 12 is guaranteed by again another circulation pump.

The hot water storage and/or preheating unit 15 then supplies various elements 14, for example showers.

The inlet system 17 for sea water is as such preheated three times before passing through the desalination units 16. At the output of the desalination units 16, the brine is evacuated by the system 17b and the fresh water is stored in a reservoir 18.

The device according to the invention is particularly intended for the generation of electricity in isolated sites of which the needs for heat are substantial, whether used directly or transformed.

The invention claimed is:

1. Power upgrade facility comprising:
    an absorption group (7) for the production of ice water, having at least:
        a thermal power feed fluid system (6),
        an ice water production system (8), able to be connected to a consumption or storage element (19),
        a low-temperature thermal power evacuation fluid system (9), having an inlet in the absorption group (7) and an outlet of the absorption group (7),
    a heat pump (10) of which the power can be modulated according to need, having at least:
        a feed fluid system of the heat pump (10) with thermal power, having an inlet in the heat pump and an outlet of the heat pump,
        a hot water production system (12),
    wherein the inlet of the feed system of the heat pump (10) is connected to the outlet of the evacuation system (9) of the absorption group (7) so as to transfer at least one portion of the low-temperature thermal power of the evacuation system (9) to the hot water production system (12).

2. Facility according to claim 1, further comprising means for regulating (20) the temperature, the electrical power, the thermal power, and the levels, measuring the temperature at different points of the systems as well as the electrical power, the thermal power, and the levels, so as to minimize the temperature differences between the input of the feed system of the heat pump and the hot water production system, in order to maximize the coefficient of performance of the heat pump.

3. Facility according to claim 1, wherein the hot water production system (12) of the heat pump (10) is connected to at least one other heat generation system (6bis, 13), in order to reach a predetermined minimum temperature in order to use this power in at least one other system that consumes thermal power, while still maintaining the COP of the heat pump (10) as high as possible.

4. Facility as claimed in claim 1, wherein the outlet of the feed system of the heat pump (10) is connected to the inlet of the evacuation system (9) in the absorption group (7).

5. Facility according to claim 4, wherein the difference in temperature between the outlet of the evacuation system (9) of the absorption group (7) and the inlet of the evacuation system (9) of the absorption group is less than 5° C. in accordance with the recommendations.

6. Facility as claimed in claim 1, wherein the ice water production system (8) of the absorption group (7) is connected to an air conditioning system.

7. Facility as claimed in claim 1, wherein the hot water production system (12) of the heat pump (10) supplies a sea water desalination unit (16).

8. Method for upgrading a facility as claimed in claim 2, wherein the means for regulating (20):
    measures the temperature, the electrical power, thermal power, and the levels, at different points of the facility;
    records these temperatures in order to establish typical curves reflecting the usage averages over a given period of time;
    compares the temperatures measured with typical curves in order to determine variations;
    according to the variations, adjusts the operating parameters of the various systems of the facility in order to anticipate the needs in power of the various heat consumption or storage stations.

9. Method of upgrading according to claim 8, wherein the means for regulating (20) adjusts the parameters of the other heat generation systems so that the temperature of the system (12) is minimal so that the COP of the heat pump (10) is maximal, and that the temperature of the hot water production system (12) of the heat pump, after exchange with the other heat generation systems (6bis, 13), allow for a heat transfer towards the consuming systems in order to reach the operating temperature of the various heat consumption or storage stations.

10. Method of upgrading according to claim 9, wherein the means for regulating (20) controls the condensation temperature of the heat pump (10).

* * * * *